US008911631B2

(12) United States Patent
Fukaya et al.

(10) Patent No.: US 8,911,631 B2
(45) Date of Patent: Dec. 16, 2014

(54) FLUORINE RECOVERING APPARATUS AND METHOD FOR RECOVERING FLUORINE

(75) Inventors: Taro Fukaya, Higashikurume (JP); Kenji Tsutsumi, Yokohama (JP); Atsushi Yamazaki, Tokyo (JP); Ichiro Yamanashi, Tokyo (JP); Shuji Seki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 309 days.

(21) Appl. No.: 13/467,826

(22) Filed: May 9, 2012

(65) Prior Publication Data

US 2012/0288435 A1 Nov. 15, 2012

(30) Foreign Application Priority Data

May 10, 2011 (JP) ................. 2011-105209

(51) Int. Cl.
*C01B 7/20* (2006.01)
*C02F 1/00* (2006.01)
*C02F 1/28* (2006.01)
*C02F 1/48* (2006.01)
*C02F 1/52* (2006.01)
*C02F 1/58* (2006.01)
*C02F 9/00* (2006.01)

(52) U.S. Cl.
CPC ... *C01B 7/20* (2013.01); *C02F 9/00* (2013.01); *C02F 1/5245* (2013.01); *C02F 1/004* (2013.01); *C02F 1/583* (2013.01); *C02F 1/48* (2013.01); *C02F 1/5236* (2013.01); *C02F 1/281* (2013.01); *C02F 2209/001* (2013.01); *C02F 1/5281* (2013.01)
USPC ........... 210/695; 210/705; 210/709; 210/806; 210/223; 423/489; 423/490

(58) Field of Classification Search
CPC ......... C01B 7/20; C02F 1/583; C02F 1/5281; C02F 1/281; C02F 1/5236; C02F 9/00; C02F 1/004; C02F 1/5245; C02F 2209/001; C02F 1/48
USPC .......... 210/695, 704, 709, 806, 223; 423/489, 423/490
See application file for complete search history.

(56) References Cited

U.S. PATENT DOCUMENTS

2009/0277843 A1 11/2009 Fukaya et al.
2012/0234767 A1* 9/2012 Fukaya et al. ................ 210/695
(Continued)

FOREIGN PATENT DOCUMENTS

CN 101229504 A 7/2008
JP 01-107890 A 4/1989
(Continued)

OTHER PUBLICATIONS

Singh et al., "Removal of Fluoride from Spent Pot Linger Leachate Using Ion Exchange," Water Environment Research, vol. 71, No. 1, pp. 36-42, Feb. 1999.
(Continued)

*Primary Examiner* — David A Reifsnyder
(74) *Attorney, Agent, or Firm* — Knobbe, Martens, Olson & Bear LLP

(57) ABSTRACT

According to one embodiment, a fluorine recovering apparatus includes a precipitating device allowing fluoride ion-containing water to react with calcium source to form precipitate, a mixing tank mixing a filter aid including particles of a magnetic material having a diameter of 0.5 to 5 μm with a dispersion medium to produce slurry, a filter aid feeder to the mixing tank, a solid-liquid separator with a filter depositing a filter aid layer, and depositing the precipitate on the filter aid layer, a cleaning mechanism removing the filter aid and the precipitate, a separating tank separating the filter aid and the precipitate, and a returning mechanism returning the filter aid to the filter aid feeder.

4 Claims, 6 Drawing Sheets

(56) References Cited

U.S. PATENT DOCUMENTS

| | | | |
|---|---|---|---|
| 2012/0234768 A1* | 9/2012 | Fukaya et al. | 210/695 |
| 2012/0238003 A1* | 9/2012 | Fukaya et al. | 435/261 |
| 2012/0312727 A1* | 12/2012 | Fukaya et al. | 210/182 |

FOREIGN PATENT DOCUMENTS

| | | |
|---|---|---|
| JP | H06-114382 | 4/1994 |
| JP | 07-047371 A | 2/1995 |
| JP | H09-327611 | 12/1997 |
| JP | 10-085761 A | 4/1998 |
| JP | 2004-249251 A | 9/2004 |
| JP | 2005-254158 A | 9/2005 |
| JP | 2005-296837 | 10/2005 |
| JP | 2005-324137 A | 11/2005 |
| JP | 2006-159042 A | 6/2006 |
| JP | 2007-275757 | 10/2007 |
| JP | 2010-069363 A | 4/2010 |
| JP | 2010-110688 | 5/2010 |
| JP | 2010-137147 A | 6/2010 |
| JP | 2010-207755 | 9/2010 |

OTHER PUBLICATIONS

Search Report and Written Opinion issued by Hungarian Intellectual Property Office on Jul. 4, 2013 in the corresponding Hungarian patent application No. 201203420-3.

Toshiba, Background Art Information, undated.

First Office Action mailed by Japan Patent Office on Apr. 2, 2013 in the corresponding to Japanese patent application No. 2011-105209 in 6 pages.

Notification of the First Office Action issued by State Intellectual Property Office (SIPO) of the People's Republic of China on Aug. 30, 2013 in the corresponding Chinese patent application No. 201210143355.7.

Xu Jinlan et al., "Lime precipitation-coagulation precipitation treating fluoride-containing wastewater test," Technology of Water Treatment, vol. 29, No. 5, pp. 282-285, Oct. 2013.

\* cited by examiner

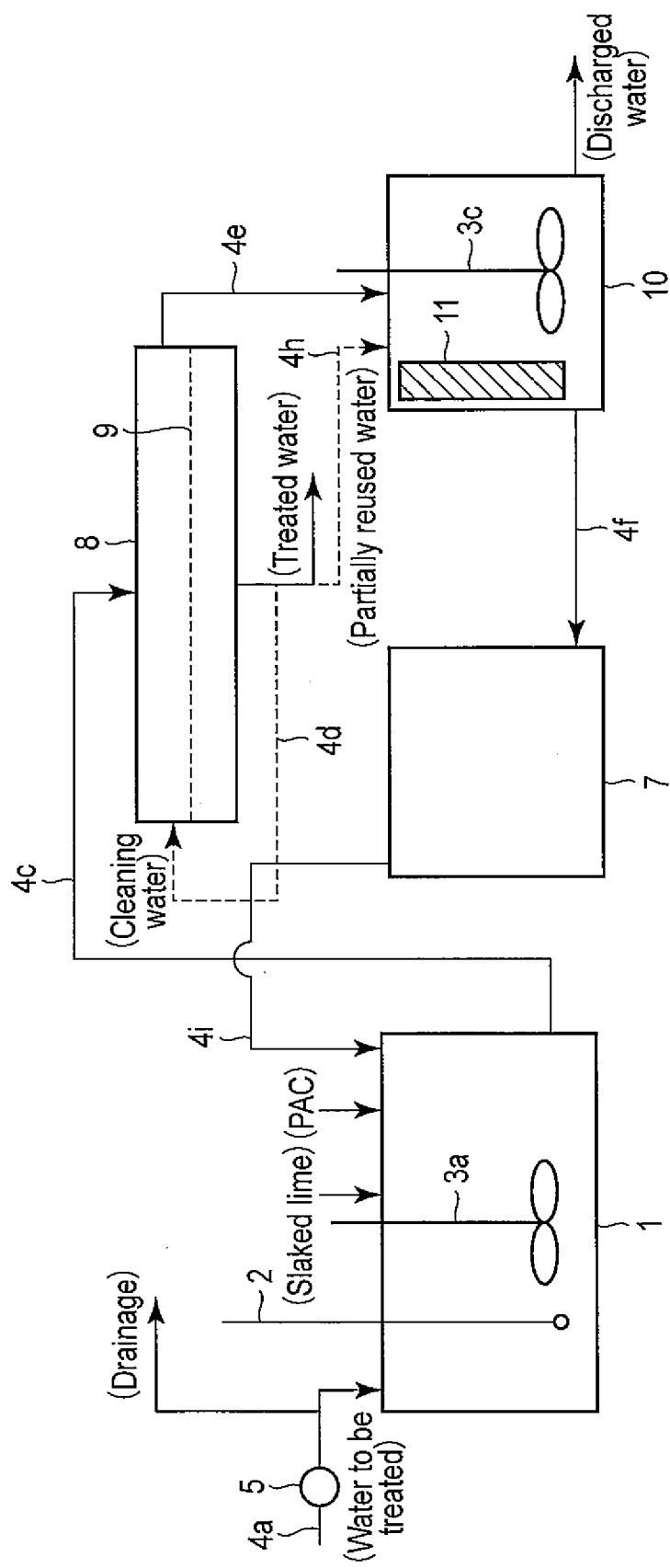
F I G. 2

FLUORINE RECOVERING APPARATUS AND METHOD FOR RECOVERING FLUORINE

CROSS-REFERENCE TO RELATED APPLICATIONS

This application is based upon and claims the benefit of priority from prior Japanese Patent Application No. 2011-105209, filed May 10, 2011, the entire contents of which are incorporated herein by reference.

FIELD

Embodiments described herein relate generally to a fluorine recovering apparatus configured to recover fluorine existing in water, and a method for recovering fluorine.

BACKGROUND

In recent years, effective use of a water resource has been required for industrial development or increasing population. For that purpose, reuse of discharged water such as industrial discharged water is very important. In order to attain the reuse, it is necessary to purify water, that is, separate other substances from the water. Various methods for separating the other substances from a liquid have been known. Examples thereof include membrane separation, centrifugal separation, activated carbon absorption, ozonization processing, and removal of suspended solids by flocculation. The methods can remove chemical substances significantly affecting environment such as phosphorous and nitrogen contained in the water, and can remove oil and clay or the like dispersed in the water. Of these, the membrane separation is one of methods most generally used to remove insoluble substances in the water. In views of protecting a membrane and increasing the flow rate of water containing a hardly dehydratable substance, a method for using a filter aid is often used. The method is referred to as a precoat method or a body feed method.

On the other hand, as a method for removing fluoride ions from water, a method for precipitating the fluoride using calcium fluoride, a method for adsorbing the fluoride ions using polyaluminum chloride, and a method for recovering the fluorine ions using a polymeric flocculant have been known.

For example, conventionally, a method for mixing precipitated calcium fluoride with a polymeric flocculant to form large flocs, and recovering the flocs has been known. The method disadvantageously results in reduced purity of the calcium fluoride recovered, which complicates the recovery of the calcium fluoride as a valuable resource. The method disadvantageously causes the incorporation of the polymeric flocculant to increase a sludge amount. A method for returning a part of precipitated calcium fluoride to form a crystal nucleus, and recovering large particles having grown from the crystal nucleus has been known. Since the method may not use the polymeric flocculant, the method solves the above-mentioned problem. However, the method disadvantageously returns a part of the calcium fluoride to reduce processing efficiency, and disadvantageously requires a time for growing the calcium fluoride to a crystal having a sufficient size. Furthermore, a method for recovering fluoride ions in water using an aluminum salt (polyaluminum chloride or the like) has been known. However, the aluminum salt is very hardly separated from the water. In this case, it is necessary to use the aluminum salt and the polymeric flocculant in combination.

As described above, the fluorine recovering treatment in the water has a plurality of steps and is troublesome. Examples of the cause include difficult separation caused by a small particle diameter of the calcium fluoride to be produced, and difficult removal of the aluminum salt added into the water.

BRIEF DESCRIPTION OF THE DRAWINGS

FIG. 2 is a schematic view of a fluorine recovering apparatus according to example 2;

DETAILED DESCRIPTION

Figure 1:
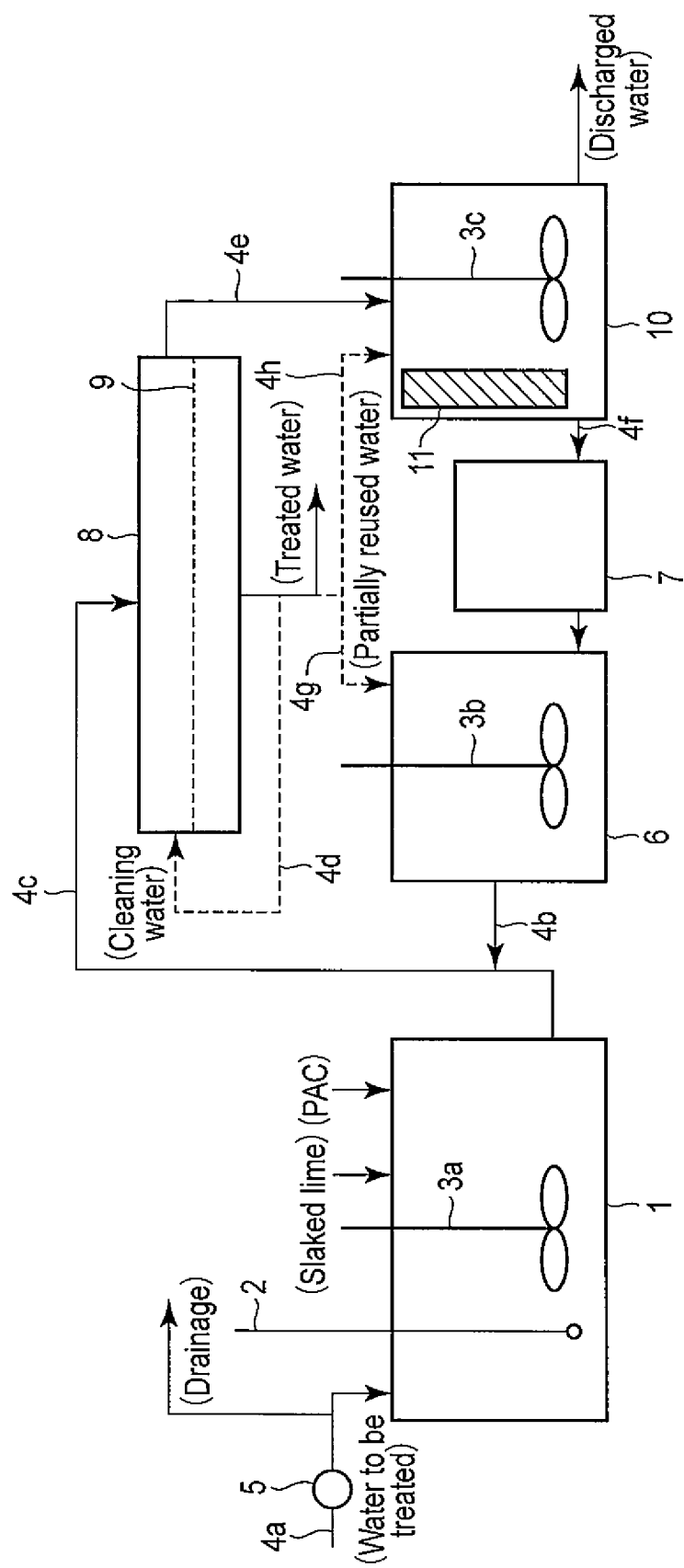
FIG. 1 is a schematic view of a fluorine recovering apparatus according to example 1.

In general, according to one embodiment, a fluoride recovering apparatus includes a precipitating device, a mixing tank, a filter aid feeder, a solid-liquid separator, a cleaning mechanism, a separating tank, and a returning mechanism. The precipitating device is configured to allow fluoride ion-containing water to be treated to react with calcium source and/or polyaluminum chloride to form fluorine-containing precipitate. The mixing tank is configured to mix a filter aid comprising particles of a magnetic material and having a primary particle diameter of 0.5 to 5 μm with a dispersion medium to produce slurry. The filter aid feeder is configured to feed the filter aid to the mixing tank. The solid-liquid separator is provided with a filter, and is configured to receive the slurry to deposit a layer made of the filter aid on the filter and to receive water containing precipitate to deposit the precipitate on the layer of the filter aid. The cleaning mechanism is configured to remove the filter aid and the precipitate from the solid-liquid separator. The separating tank is configured to separate the filter aid and the precipitate. The returning mechanism is configured to return the filter aid separated in the separating tank to the filter aid feeder.

Hereinafter, the fluorine recovering apparatus and a method for recovering fluorine according to one embodiment will be described in detail.

In this embodiment, a filter aid comprising particles of a magnetic material and having a primary particle diameter of 0.5 to 5 μm is used. Here, the primary particle diameter is measured by a laser diffraction method. Specifically, when the particles include primary particles of the magnetic material, the primary particle diameter can be measured by means of, for example, a SALD-DS21 type measuring device (trade name) manufactured by Shimadzu Corp. When the particles are flocculated, the primary particle diameter can be obtained by using SEM observation and image processing in combination. When the primary particle diameter is larger than 5 μm, the distance between the particles is excessively increased, which may cause the pass of fine precipitates in water to be described later. When the primary particle diameter is smaller than 0.5 μm, the particles are densely flocculated. Although densely flocculated particles can remove the fine precipitates in the water, an effective water flow rate cannot be obtained in some cases.

A ferromagnetic substance can be generally used as the magnetic material. Examples thereof include iron, an alloy containing iron, magnetic iron ore, titanic iron ore, magnetic pyrite, or a ferrite compound such as magnesia ferrite, cobalt ferrite, nickel ferrite, and barium ferrite. Of these, the ferrite compound having excellent stability in the water is more useful. For example, magnetite ($Fe_3O_4$) which is the magnetic iron ore is inexpensive, is stabilized as the magnetic material in the water, and is safe also as an element. Thereby, since the magnetite is likely to be used for water treatment, the magnetite is preferable. Although the magnetic material can have various shapes such as a spherical shape and a polyhedron or be an indefinite shape, the shape thereof is not particularly limited. A desirable particle diameter and shape of a magnetic carrier for using may be suitably selected in view of a manufacturing cost or the like. In particular, a spherical shape or the polyhedral structure having round corners is preferable. If necessary, these magnetic materials may be subjected to usual plating such as Cu plating and Ni plating.

The fluorine recovering apparatus according to this embodiment includes the following two types.

(First Fluorine Recovering Apparatus)

A first fluorine recovering apparatus uses a technique referred to as a so-called precoat method. The first fluorine recovering apparatus is particularly effective when the concentration of a fluorine-containing precipitate (such as a precipitate of calcium fluoride and polyaluminum chloride including fluoride ions) precipitated in the water is low.

First, the filter aid comprising particles of a magnetic material and the dispersion medium are mixed to prepare a suspension. The filter aid comprising the particles of the magnetic material can be constituted as described above. Although water is mainly used as the dispersion medium, the other dispersion medium can be suitably used. The concentration of the filter aid in the suspension is not particularly limited as long as a precoat layer can be formed by the following operation. For example, the concentration is adjusted to about 10,000 to about 200,000 mg/L.

Then, the suspension is made to pass through the filter, to filter the filter aid in the suspension to leave the filter aid on the filter, and thereby a filter layer obtained by depositing the filter aid, that is, the precoat layer is formed. In this circumstance, the suspension is made to pass through the filter under pressure. In the case of a filtering device having a filter disposed in a direction perpendicular to the ground, the precoat layer may collapse during filtration, which may complicate control. In the embodiment, a filtering device which makes water pass from the top to the bottom in the direction perpendicular to the ground, and has a filtration surface parallel to the ground is preferably used.

Since the precoat layer is formed and held by the action of an external force as described above, for example, the filter is disposed so as to close the opening of a container. The filter aid is left on the filter thus disposed, is arranged, and deposited. In this case, the precoat layer is formed and held by an external force from the wall surface of the container and a downward external force (gravitational force) caused by the weight of the filter aid located above. The thickness of the precoat layer varies according to the concentration of a liquid to be treated. The thickness may be about 0.1 to about 10 mm.

Then, the treated water having a precipitated fluoride is made to pass through the precoat layer formed as described above, to remove an insoluble matter. The treated water is generally made to pass through the precoat layer under pressure. At this time, the fluoride is adsorbed on the surface of the precoat layer, specifically, the filter aid constituting the precoat layer, and is removed. If the magnetic material having a controlled primary particle diameter of 0.5 to 5 μm is used to trap the insoluble substance, a sufficient water flow rate can be obtained.

The fluoride in the water is thus removed, and then, the precoat layer is dispersed in a dispersion medium. Thereby, the precoat layer is decomposed into the filter aid, and the filter aid is cleaned. This cleaning may be performed in the container in which the filter is set, or in the other container. When the cleaning is performed in the other container, the precoat layer is decomposed into the filter aid using means such as cleaning, and the filter aid is then transported. Although water is generally used for cleaning, the cleaning can also be performed using a surfactant or an organic solvent.

Then, the cleaned filter aid is recovered using magnetic separation. A method for the magnetic separation is not particularly limited. Examples thereof include a method for putting a permanent magnet or an electrical magnet in the container containing the filter aid to recover the filter aid, and a method for recovering the filter aid using a metal mesh or the like magnetized with a magnet and releasing a magnetic field to recover particles.

In the first fluorine recovering apparatus, the precoat layer is previously formed on the filter, and then, the water including fluoride is made to pass. Thereby, the amount of the fluoride adsorbed on the surface of the filter aid with a processing time is increased. As a result, the particularly excessively adsorbed fluoride fills up the voids of the filter aid, which reduces the water flow rate. Therefore, as described above, the first fluorine recovering apparatus is effective when the concentration of the fluoride in the water is low.

(Second Fluorine Recovering Apparatus)

A second fluorine recovering apparatus uses a technique referred to as a so-called body feed method. As described later, the second fluorine recovering apparatus is effective when the concentration of a fluoride in water is high.

Also in this recovering apparatus, first, a filter aid is mixed with a dispersion medium to prepare a suspension. However, water to be treated is used as the dispersion medium in this case. That is, in the method, a filter aid is directly put in the water to be treated, to prepare the suspension. The concentration of the filter aid in the suspension is not particularly limited as long as a filter layer can be formed by the following operation. For example, the concentration is adjusted to about 1,000 to about 200,000 mg/L.

Then, the suspension is made to pass through a filter, to filter the filter aid in the suspension to leave the filter aid on the filter, and thereby a filter layer formed by flocculating the filter aid is formed. The suspension is made to pass through the filter under pressure.

Since the filter layer is formed and held by the action of an external force as described above, for example, the filter is disposed so as to close the opening of a container. The filter aid is left on the filter thus disposed, is arranged, and deposited. In this case, the filter layer is formed and held by an external force from the wall surface of the container and a downward external force (gravity) caused by the weight of the filter aid located above.

The fluoride in the water is removed as described above, and the filter layer is then dispersed in a dispersion medium. The filter layer is decomposed into the filter aid, and the filter aid is cleaned. This cleaning may be performed in the container in which the filter is set, or in the other container. When the cleaning is performed in the other container, the filter layer is decomposed into the filter aid using means such as cleaning, and the filter aid is then transported. Although water is generally used for cleaning, the cleaning can also be performed using a surfactant or an organic solvent.

Then, the cleaned filter aid is recovered using magnetic separation. A method of the magnetic separation is not particularly limited. Examples thereof include a method for putting a permanent magnet or an electrical magnet in the container to recover the filter aid, and a method for recovering the filter aid using a metal mesh or the like magnetized with a magnet, and releasing a magnetic field to recover particles.

Since the filter aid constituting the filter layer is contained in the suspension prepared using the water to be treated in the second fluorine recovering apparatus, the filter aid is always fed with the water containing the fluoride which should be removed.

Therefore, the water containing the fluoride and the filter aid are simultaneously fed in the second fluorine recovering apparatus. Thus, even when the amount of the fluoride in the water is particularly high, the excessively adsorbed fluoride does not fill up the voids of the filter aid, unlike the first fluorine recovering apparatus. Consequently, a filtration rate can be maintained for a long time. As a result, the second fluorine recovering apparatus is effective when the concentration of the fluoride in the water to be treated is high.

Next, a precipitating method and a method for measuring fluoride ions in the fluorine recovering apparatus according to one embodiment will be described.

In the embodiment, two threshold values (a first threshold value A, a second threshold value B, where A>B) of the concentration of fluoride ions in water are set. When the concentration is higher than the first threshold value A, the fluoride ions are reacted with calcium. When the concentration is higher than the second threshold value B, the fluoride ions are reacted with polyaluminum chloride (hereafter, referred to as PAC). Although the threshold value includes various values depending on the design of the apparatus, the first threshold value A which is a criteria for reacting the fluoride ions with the calcium may be set to be equal to or higher than about 500 mg/L. The second threshold value B for adding the PAC may be set to be equal to or less than a wastewater standard value or a self-management standard value. The second threshold value B may be set to about 5 mg/L. Any methods can be used as a method for detecting a fluoride ion concentration as needed. For example, industrial simplified fluoride ion concentration sensor HC-200F (trade name, manufactured by HORIBA, Ltd.) can be used.

Examples of a calcium source used for reacting the fluoride ions with the calcium include calcium hydroxide (slaked lime), calcium chloride, calcium carbonate, and calcium sulfate. The calcium source is dissolved in water to generate calcium ions. The ions are reacted with fluoride to form calcium fluoride which is precipitated. The calcium carbonate or the like which is hardly dissolved in the water may be reacted on the surface, to generate the calcium fluoride on the surface of the calcium carbonate. The calcium fluoride generated on the surface of the calcium carbonate may be stripped from the surface, to be dispersed in the water. In any case, the calcium fluoride is dispersed in the water as very fine particles.

The PAC used as a flocculant for usual water treatment is used. The PAC takes in the fluoride ions, and is precipitated as hardly dehydratable flocs in the water. The amount of the PAC to be added is about 1 to about 5 times higher than the fluoride ion concentration depending on the design condition of a plant.

It is very difficult to recover the calcium fluoride thus precipitated and the PAC precipitate. Heretofore, a cationic polymer or the like has been added, to form flocs. As opposed to this, it is not necessary to perform further operations in the embodiment. This is because the calcium fluoride can be directly removed by dehydration in the embodiment.

The fluorine recovering apparatus can be also used as a pretreatment apparatus for discharged water in which the water to be treated is allowed to react with the calcium without providing the threshold value of the fluoride ion concentration and removes the precipitated calcium fluoride using the filter aid.

Since the processing is not completed by only the pretreatment apparatus in this case, the fluorine removal is completed by using the pretreatment apparatus and the other aftertreatment apparatus in combination. Since the PAC is not used when the fluorine recovering apparatus is used as the pretreatment apparatus, advantageously, a time required for reproducing the filter aid is extremely reduced. Since the purity of the recoverable calcium fluoride is increased, a high addition value can be also applied to the calcium fluoride.

Next, examples will be specifically described in detail.
(Preparation of Filter Aid)

The following filter aids are provided:
(Filter aid A) Magnetite particles (mean particle diameter: 2 μm);
(Filter aid B) Magnetite particles (mean particle diameter: 0.5 μm); and
(Filter aid C) Magnetite particles (mean particle diameter: 5 μm).

The following magnetite particles are provided as comparative examples:
(Filter aid D) Magnetite particles (mean particle diameter: 0.2 μm); and
(Filter aid E) A flocculant of magnetite particles (mean particle diameter: 26 μm).

Example 1

FIG. 1 shows a schematic view of a fluorine recovering apparatus according to example 1.

Reference number 1 in FIG. 1 designates a precipitation tank (precipitating device) provided with a fluoride ion concentration sensor 2 and a stirrer 3a. The precipitation tank 1 is configured to receive fluoride ion-containing water to be treated, slaked lime, and polyaluminum chloride (PAC). In the precipitation tank 1, the water to be treated may react with calcium to precipitate calcium fluoride. A pipe 4a is configured to feed the water to be treated to the precipitation tank 1. A fluoride ion concentration sensor 5 is provided in the pipe 4a, to detect the fluoride ion concentration in the water to be treated.

Reference number 6 in FIG. 1 designates a first mixing tank provided with a stirrer 3b. The first mixing tank has a function of mixing a filter aid with a dispersion medium. Here, the filter aid contains particles of a magnetic material. The particles contained in the filter aid have a primary particle diameter of 0.5 to 5 μm. A filter aid tank (filter aid feeder) 7 is connected to the mixing tank 6 to feed the filter aid to the mixing tank 6. A pipe 4b from the mixing tank 6 is connected to a pipe 4c which in turn connects the precipitation tank 1 to a filtering device (solid-liquid separator) 8. The filtering device 8 is provided with a filter 9 disposed in a horizontal direction in parallel to the ground. The filter aid will be deposited on the filter 9. The filter aid is obtained by filtering slurry produced in the mixing tank 6.

A cleaning mechanism (not shown) is provided, which has a function of removing the filter aid deposited on the filter 9 of the filtering device 8. The cleaning mechanism includes a pipe 4d which connects the bottom part of the filtering device 8 to a portion of the filtering device 8 located above the filter 9, and a pump and a switching valve (not shown) or the like provided in the pipe 4d. The part of the filtering device 8 located above the filter 9 is connected to a separating tank 10 via a pipe 4e. Here, the separating tank 10 is provided with a magnet 11 and a stirrer 3c. The separating tank 10 has a function of separating the filter aid from the calcium fluoride. The separating tank 10 and the filter aid tank 7 are connected via a pipe 4f. Here, a returning mechanism includes the pipe 4f, and a pump and a switching valve (not shown) or the like provided in the pipe 4f. Reference number 4g in FIG. 1 designates a pipe which connects the bottom part of the filtering device 8 to the mixing tank 6. Reference number 4h in FIG. 1 designates a pipe which connects the bottom part of the filtering device 8 to the separating tank 10.

Figure 5:
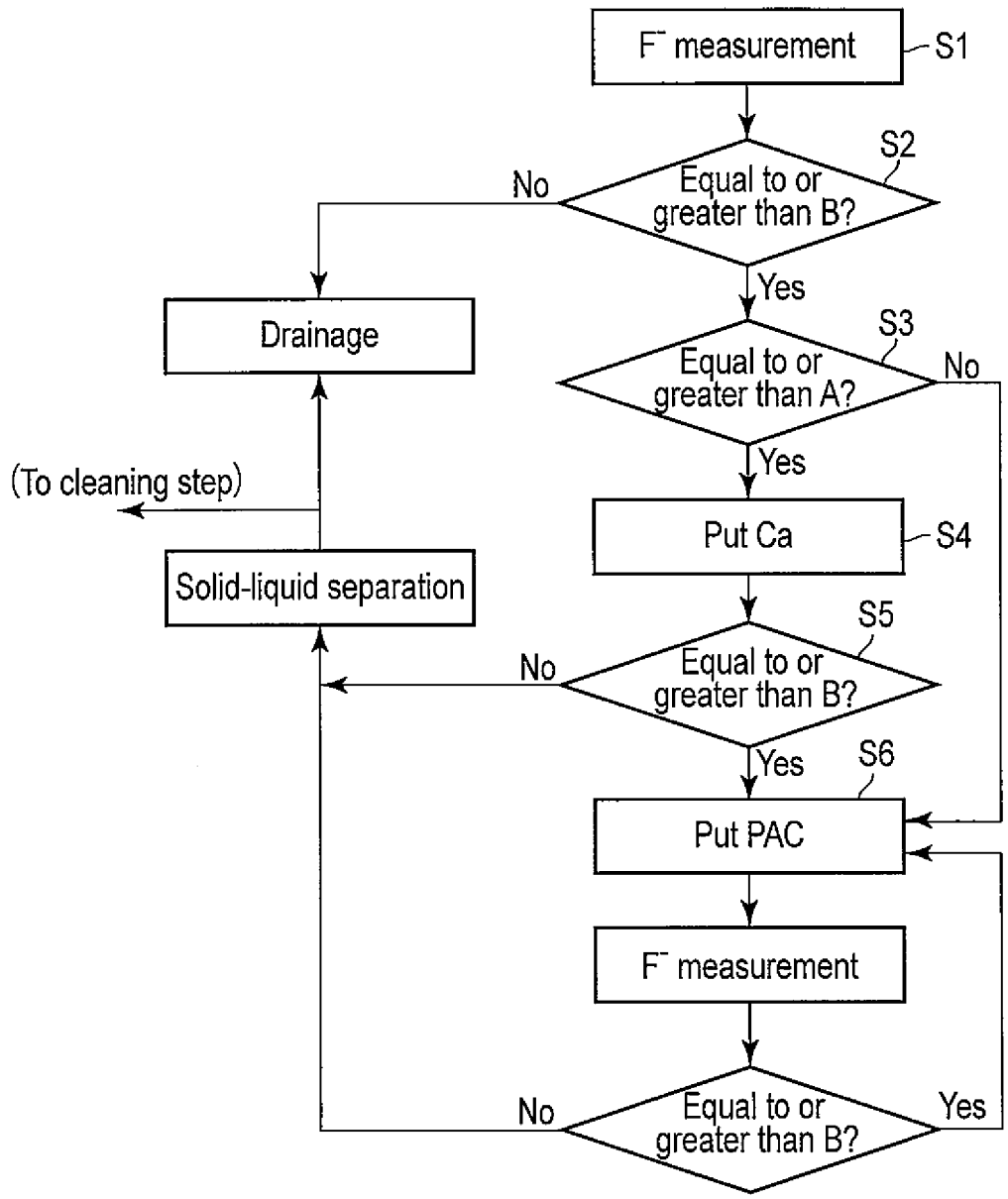
FIG. 5 is a flow chart of water to be treated, by the fluorine recovering apparatus according to example 1.

Next, the operation of the fluorine recovering apparatus of FIG. 1 will be described with reference to the flow chart of FIG. 5.

The fluoride ion concentration in the fluorine-containing water to be treated is initially measured by the fluoride ion concentration sensor 5 (S1). It is determined whether or not the concentration is equal to or higher than the second threshold value B (S2). When the concentration is less than the second threshold value B, the water to be treated is directly drained off without performing a fluorine-recovering treatment described below.

The water to be treated having a fluoride ion concentration equal to or higher than the second threshold value B is fed to the precipitation tank 1. Then, it is determined whether or not the fluoride ion concentration in the water to be treated in the precipitation tank 1 is equal to or higher than the first threshold value A (S3). When the concentration is equal to or higher than the first threshold value A, the slaked lime as a calcium source is put in the precipitation tank 1 (S4), and is mixed with the water to be treated. After a certain time elapses, the fluoride ion concentration sensor 2 is used to measure the fluoride ion concentration in the water containing calcium fluoride to determine whether or not the concentration is equal to or higher than the second threshold value B (S5). When the fluoride ion concentration measured in S5 is equal to or less than the second threshold value B, the water is sent to the filtering device 8 to subject the water to solid-liquid separation. Note that, when the concentration measured in the S3 step is higher than the second threshold value B and less than the first threshold value A, the S4 step is omitted.

When the fluoride ion concentration measured in S5 is higher than the second threshold value B, PAC is put in the precipitation tank 1 to mix the PAC with the water containing calcium fluoride (S6). Then, the fluoride ion concentration sensor 2 is used to measure the fluoride ion concentration in the water contained in the precipitation tank 1. These operations are repeated until the fluoride ion concentration measured is equal to or less than the second threshold value B.

Also, in parallel to these operations, a layer made of the filter aid is formed on the filter 9 of the filtering device 8 as follows. First, the filter aid is sent to the mixing tank 6 from the filter aid tank 7. The filter aid is mixed with a part of treated water from filtering device 8, to produce filter aid slurry. The filter aid slurry is sent to filtering device 8 to form the layer made of the filter aid on the filter 9.

After the layer is formed, the water contained in precipitation tank 1 having a fluoride ion concentration equal to or less than the second threshold value B is fed to the filtering device 8 under pressure. The solid-liquid separation (filtration) is performed using the layer previously formed and made of the filter aid. A filtrate is a weak alkaline treated liquid from which the fluoride has been removed, and may be drained off as it is. However, the filtrate can be also used as cleaning water of the filtering device 8, cleaning water of the magnet 11 of the separating tank 10, and a liquid in producing the filter aid slurry in the mixing tank 6.

After the filtration of the water treated in the precipitation tank 1 is completed, a cake made of the filter aid and the precipitated fluoride (mainly, calcium fluoride) has been deposited on the filter 9 in the filtering device 8. In order to clean the cake, cleaning water is fed from the side of the filter 9 to collapse the cake, which is fed to the separating tank 10. Since the separating tank 10 is provided with the stirrer 3c and the magnet 11, the separating tank 10 separates the filter aid from the fluoride during mixing. The separating tank 10 recovers only the filter aid using the magnet 11. The liquid from which the filter aid has been recovered is discharged as fluorine-concentrated water containing a high-concentration fluoride. The filter aid is cleaned with the fed cleaning water, and is then returned to the filter aid tank 7. Thus, the returned filter aid is fed again to the mixing tank 6 and is reused.

In example 1, a hydrogen fluoride aqueous solution containing 50 mg/L of fluorine ions was provided as the water to be treated. The first threshold value A was set to 100 mg/L, and the second threshold value B was set to 10 mg. Since the fluorine ion concentration was higher than the second threshold value B, the water was fed to the precipitation tank 1. Since the fluoride ion concentration was less than the first threshold value A, the PAC was added so that a solid content thereof was 250 mg/L without adding the slaked lime (calcium compound), and was stirred for 10 minutes. As a result, white sediments were precipitated, and the fluorine ion concentration in the water treated in the precipitate tank 1 was 8 mg/L, which is less than the second threshold value B.

In example 1, a filter aid A was used as the filter aid. The filter aid was fed from the filter aid tank 7 to the mixing tank 6 and then water was supplied thereto to produce filter aid slurry. This was fed to the filtering device 8 to deposit a filter aid layer having an average thickness of 1 mm on the filter 9. Then, the water treated in the precipitation tank 1 was fed to the filtering device 8 from the precipitation tank 1, to filter the water to be treated. It could be confirmed that 99% or higher the fluoride (a reaction product between PAC and fluorine ions) contained in the water treated in the precipitation tank 1 is recovered.

Cleaning water was fed from the side of the filter 9 of the filtering device 8 after the filtration processing. The layer formed on the filter 9 was collapsed, and was fed to the separating tank 10. Then, after the filter aid was separated from the fluoride by operating the stirrer 3c in the separating tank 10, the magnet 11 was operated to recover only the filter aid, and a fluoride-concentrated liquid was discharged. Then, the magnetic field of the magnet 11 was released, and cleaning water was fed to produce the filter aid slurry. Then, the filter aid slurry was returned to the filter aid tank 7. Then, the filter aid slurry was fed to the mixing tank 6, and the same operations were performed. The filter aid slurry could be reused without any problem.

Example 2

A test was performed in the same manner as in example 1 using the same apparatus as that of example 1 except that the filter aid B was used in place of the filter aid A. As a result, the recovery ratio of fluoride was equal to or higher than 99%. In the case of example 2, the water flow rate of a filtering device was one third of that of example 1. The apparatus could be driven without any problem.

Example 3

A test was performed in the same manner as in example 1 using the same apparatus as that of example 1 except that the filter aid C was used in place of the filter aid A. As a result, the recovery ratio of fluoride was about 97%. In the case of example 3, the water flow rate of a filtering device was roughly double of that of example 1. The apparatus could be driven without any problem.

Comparative Example 1

A test was performed in the same manner as in example 1 using the same apparatus as that of example 1 except that the filter aid D was used in place of the filter aid A. When fluoride was recovered in the case of comparative example 1, water could not be made to pass on the way.

Comparative Example 2

A test was performed in the same manner as in example 1 using the same apparatus as that of example 1 except that the filter aid D was used in place of the filter aid A. When fluoride was recovered in the case of comparative example 2, a part of the fluoride was contained in the filtrate. Then, a filtration flow rate was remarkably reduced, and water could not be made to pass.

Example 4

FIG. 2 shows a schematic view of a fluorine recovering apparatus according to Example 4. The same members as those in FIG. 1 are represented by the same reference numbers, and the descriptions thereof will be omitted. The recovering apparatus of FIG. 2 is different from the recovering apparatus of FIG. 1 in that a pipe 4i which connects the filter aid tank 7 to the precipitation tank 1 is provided, while the first mixing tank 6 and the pipe 4g are not provided. Therefore, not only water to be treated, slaked lime, and PAC, but also the filter aid can be fed to the precipitation tank 1 in FIG. 2.

In the same manner as in example 1, a fluoride ion concentration in fluorine-containing water to be treated is initially measured by the fluoride ion concentration sensor 5. When the concentration is equal to or less than the second threshold value B, the water to be treated is directly drained off without performing the fluorine recovering treatment described below.

The water to be treated having a higher fluoride ion concentration than the second threshold value B is fed to the precipitation tank 1. When the water to be treated has a higher fluoride ion concentration than the first threshold value A, the slaked lime as a calcium source is put in the precipitation tank 1 and mixed with the water to be treated. After a certain time elapses, the fluoride ion concentration sensor 2 is used to measure the fluoride ion concentration in the water in the precipitation tank 1. When the concentration is equal to or less than the second threshold value B, the water to be treated is send to a filtering device 8. Note that, when the concentration measured in the S3 step is higher than the second threshold value B and less than the first threshold value A, the S4 step is omitted. When the fluoride ion concentration in the water mixed with the calcium is higher than the second threshold value B, the PAC is put in the precipitation tank 1 and mixed with the water. Then, the fluoride ion concentration sensor 2 is used to measure the fluoride ion concentration in the water contained in the precipitation tank 1. These operations are repeated until the measured fluoride ion concentration in the water contained in the precipitation tank 1 is equal to or less than the second threshold value B.

Example 4 is different from Example 1 in that the filter aid is directly sent to the precipitation tank 1 from the filter aid tank 7 after the above-mentioned operation to produce slurry. The slurry is fed to the filtering device 8 under pressure, to form a layer made of the filter aid on the filter 9 and to filter the precipitate.

After the filtration of the water from the precipitation tank 1 is completed, a cake made of the filter aid and the precipitated fluoride (mainly, calcium fluoride) has been deposited on the filter 9 in the filtering device 8. In order to clean the cake, cleaning water is fed from the side of the filter 9 to collapse the cake, which is fed to the separating tank 10. In the separating tank 10, the filter aid is separated from the fluoride while stirring the liquid containing the filter aid and the fluoride by the stirrer 3c. The separating tank 10 recovers only the filter aid using the magnet 11. The liquid from which the filter aid has been recovered is discharged as fluorine concentrated water containing a high-concentration of fluoride. The filter aid is cleaned with the fed cleaning water, and is then returned to the filter aid tank 7. Thus, the returned filter aid is fed again to the precipitation tank 1 and is reused.

In Example 4, a hydrogen fluoride aqueous solution containing 200 mg/L of the fluorine ions was provided as the water to be treated. The first threshold value A was set to 100 mg/L, and the second threshold value B was set to 10 mg/L. Since the fluoride ion concentration was higher than the second threshold value B, the water to be treated was fed to the precipitation tank 1. Since the fluorine ion concentration was higher than the first threshold value A, 5000 mg/L of the slaked lime (calcium compound) was added. Since the fluoride ion concentration measured after sufficient stirring was 24 mg/L, 125 mg/L of PAC was added, and they were further mixed. The resulting fluorine ion concentration in the water contained in the precipitation tank 1 was 8 mg/L, which is less than the second threshold value B.

Two percent by weight of filter aid A was added to the water contained in the precipitation tank 1 to produce slurry. The slurry was sent to the filtering device 8, and then, filtration was performed. It could be confirmed that 99% or higher of the fluoride (calcium fluoride, and a reaction product of PAC and fluorine ion) in the water from the precipitation tank 1 is recovered. Cleaning water was fed from the side of the filter 9 of the filtering device 8 after the filtration processing. The layer formed on the filter 9 was collapsed, and was fed to the separating tank 10. Then, after the filter aid was separated from the fluoride by operating the stirrer 3c in the separating tank 10, the magnet 11 was operated to recover only the filter aid, and the fluorine-concentrated liquid was discharged. Then, the magnetic field of the magnet 11 was released, and cleaning water was fed to produce filter aid slurry. Then, the filter aid slurry was returned to the filter aid tank 7. Then, the filter aid slurry was fed to the precipitation tank 1, and the same operations were performed. The filter aid slurry was reused without any problem.

Example 5

Figure 3:
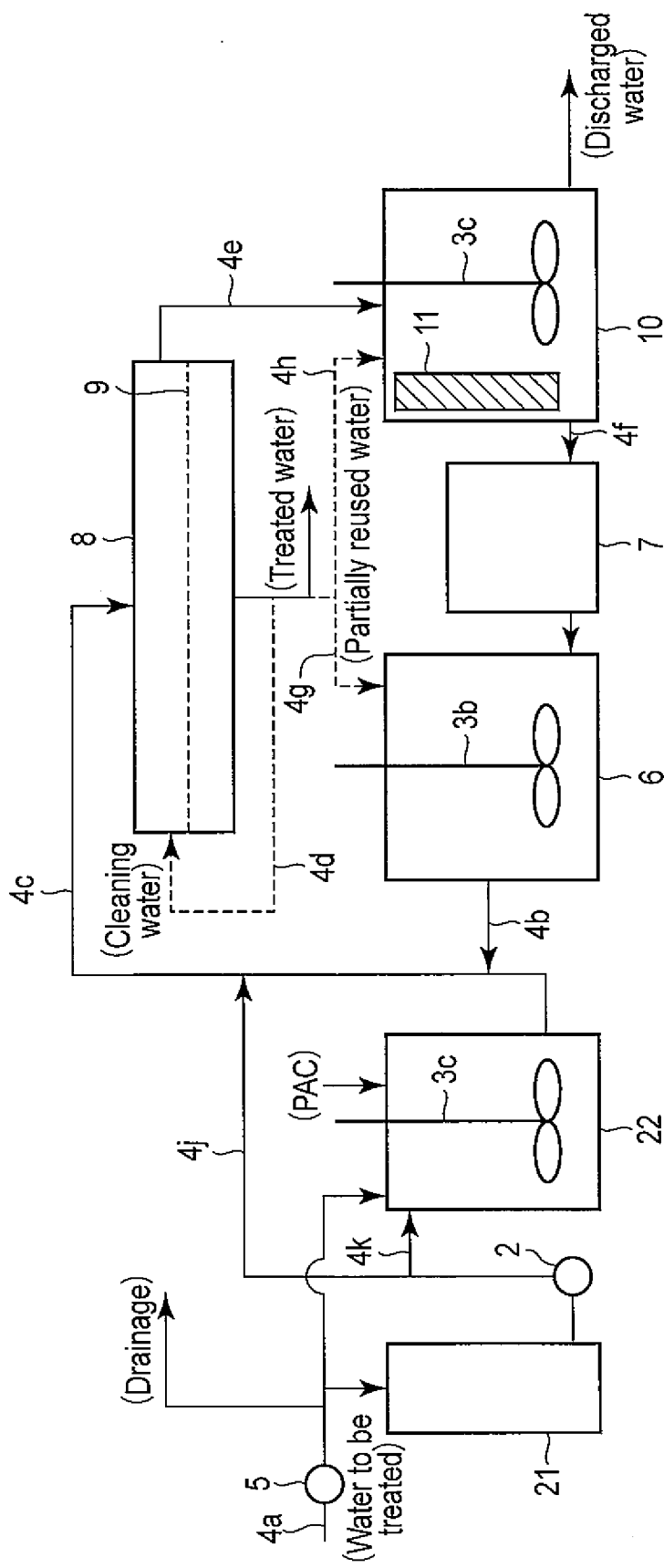
FIG. 3 is a schematic view of a fluorine recovering apparatus according to example 5.

FIG. 3 shows a schematic view of the fluorine recovering apparatus according to Example 5. The same members as those in FIG. 1 are represented by the same reference numbers, and the descriptions thereof will be omitted. The recovering apparatus of FIG. 3 is different from the recovering apparatus of FIG. 1 in the following points. First, a precipitating device 23 is provided, which includes an adsorption column 21 filled with calcium carbonate particles and a second mixing tank 22 provided with a stirrer 3c, in place of the precipitation tank 1. Next, the pipe 4a is connected to the adsorption column 21 and the second mixing tank 22. The adsorption column 21 and a pipe 4c are connected via a pipe 4j in which a fluoride ion concentration sensor 2 is provided. In FIG. 3, a pipe 4k branched from the pipe 4j is connected to the second mixing tank 22.

Therefore, the adsorption column 21 and the second mixing tank 22 are configured to receive fluoride ion-containing water to be treated. PAC can also be fed to the second mixing tank 22.

In Example 5, a hydrogen fluoride aqueous solution containing 200 mg/L of fluorine ions was provided as the water to be treated. A first threshold value A was set to 50 mg/L, and a second threshold value B was set to 10 mg/L. Since the fluorine ion concentration was higher than the first threshold value A, the water to be treated was sent to the adsorption column 21 filled with the calcium carbonate particles, and the calcium carbonate particles were reacted with fluorine. The liquid discharged from the adsorption column 21 was an opaque liquid having a fluoride ion concentration of 50 mg/L. Therefore, the liquid was sent to the second mixing tank 22, and 250 mg/L of PAC was added. The fluorine ion concentration in the water was reduced to 7 mg/L.

On the other hand, a filter aid was fed to a first mixing tank 6 from a filter aid tank 7 filled with a filter, aid A, and water was mixed with the filter aid to produce filter aid slurry. This slurry was fed to a filtering device 8 to form a filter aid layer having an average thickness of 1 mm on a filter 9. Then, the water treated in the second mixing tank 22 was fed to the filtering device 8 from the second mixing tank 22, and then filtration was performed. It could be confirmed that 99% or higher of the fluoride (calcium fluoride, a reaction product between PAC and fluoride ions) in the water treated in the second mixing tank 22 is recovered.

Cleaning water was fed from the side of the filter 9 of the filtering device 8 after the filtration processing. The layer formed on the filter 9 was collapsed, and was fed to the separating tank 10. Then, after the filter aid was separated from the fluoride by operating the stirrer 3c in the separating tank 10, the magnet 11 was operated to recover only the filter aid, and the fluorine-concentrated liquid was discharged. Then, the magnetic field of the magnet 11 was released, and cleaning water was fed to produce filter aid slurry. Then, the filter aid slurry was returned to the filter aid tank 7. Then, the filter aid slurry was fed to the first mixing tank 6, and the same operations were performed. The filter aid slurry was reused without any problem.

Example 6

Figure 4:
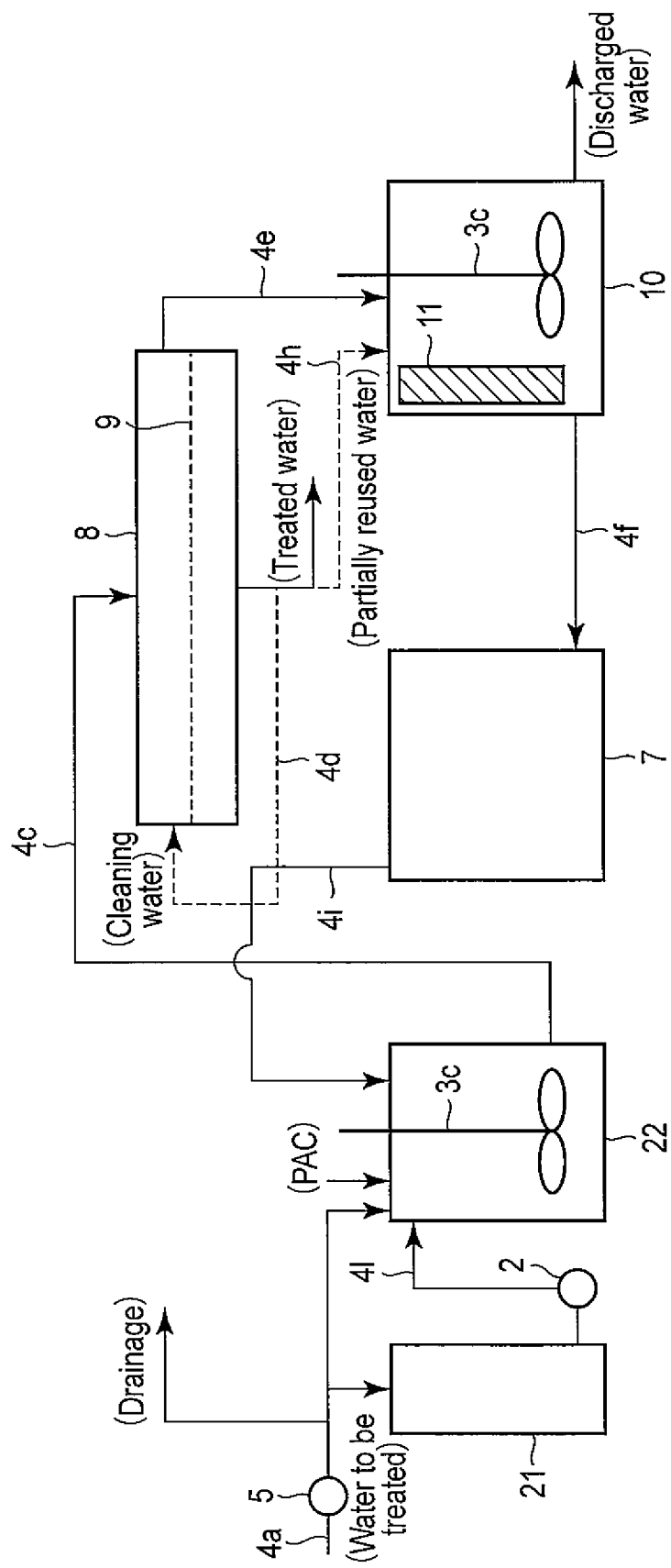
FIG. 4 is a schematic view of a fluorine recovering apparatus according to example 6.

FIG. 4 shows a schematic view of the fluorine recovering apparatus according to Example 6. The same members as those in FIGS. 1 to 3 are represented by the same reference numbers, and the descriptions thereof will be omitted. The recovering apparatus of FIG. 4 is different from the recovering apparatus of FIG. 2 in the following points. First, a precipitating device 23 is provided, which includes an adsorption column 21 filled with calcium carbonate particles and a second mixing tank 22 provided with a stirrer 3c in place of the precipitation tank 1. Next, a pipe 4a is connected to the adsorption column 21 and the second mixing tank 22. The adsorption column 21 and a pipe 4c are connected via a pipe 4l in which a fluoride ion concentration sensor 2 is provided.

Therefore, the adsorption column 21 and the second mixing tank 22 are configured to receive fluoride ion-containing water to be treated. PAC can be also fed to the second mixing tank 22.

In Example 6, a hydrogen fluoride aqueous solution containing 200 mg/L of the fluoride ions was provided as the water to be treated. A first threshold value A was set to 50 mg/L, and a second threshold value B was set to 10 mg/L. Since the fluoride ion concentration was higher than the first threshold value A, the water to be treated was sent to the adsorption column 21 filled with the calcium carbonate particles, and the calcium carbonate particles were reacted with fluoride. Since the liquid discharged from the adsorption column 21 was an opaque liquid having a fluoride ion concentration of 50 mg/L. Therefore, the liquid to be treated was sent to the second mixing tank 22, and the PAC of 250 mg/L was added. The fluoride ion concentration in the water was reduced to 7 mg/L.

On the other hand, a filter aid was fed to the second mixing tank 22 from a filter aid tank 7 filled with a filter aid A to produce slurry. Then, the slurry was fed to the filtering device 8, and then filtration was performed. It could be confirmed that 99% or higher of the fluoride (calcium fluoride, a reaction product of PAC and fluoride ions) in the water treated in the second mixing tank 22 is recovered. Cleaning water was fed from the side of the filter 9 of the filtering device 8 after the filtration processing. The layer formed on the filter 9 was collapsed, and was fed to the separating tank 10. Furthermore, after the filter aid was separated from the fluoride by operating the stirrer 3c in the separating tank 10, the magnet 11 was operated to recover only the filter aid, and the fluorine-concentrated liquid was discharged. Then, the magnetic field of the magnet 11 was released, and cleaning water was fed to produce filter aid slurry. Then, the filter aid slurry was returned to the filter aid tank 7. Then, the filter aid slurry was fed to the second mixing tank 22, and the same operations were performed. The filter aid slurry was reused without any problem.

Example 7

Figure 6:
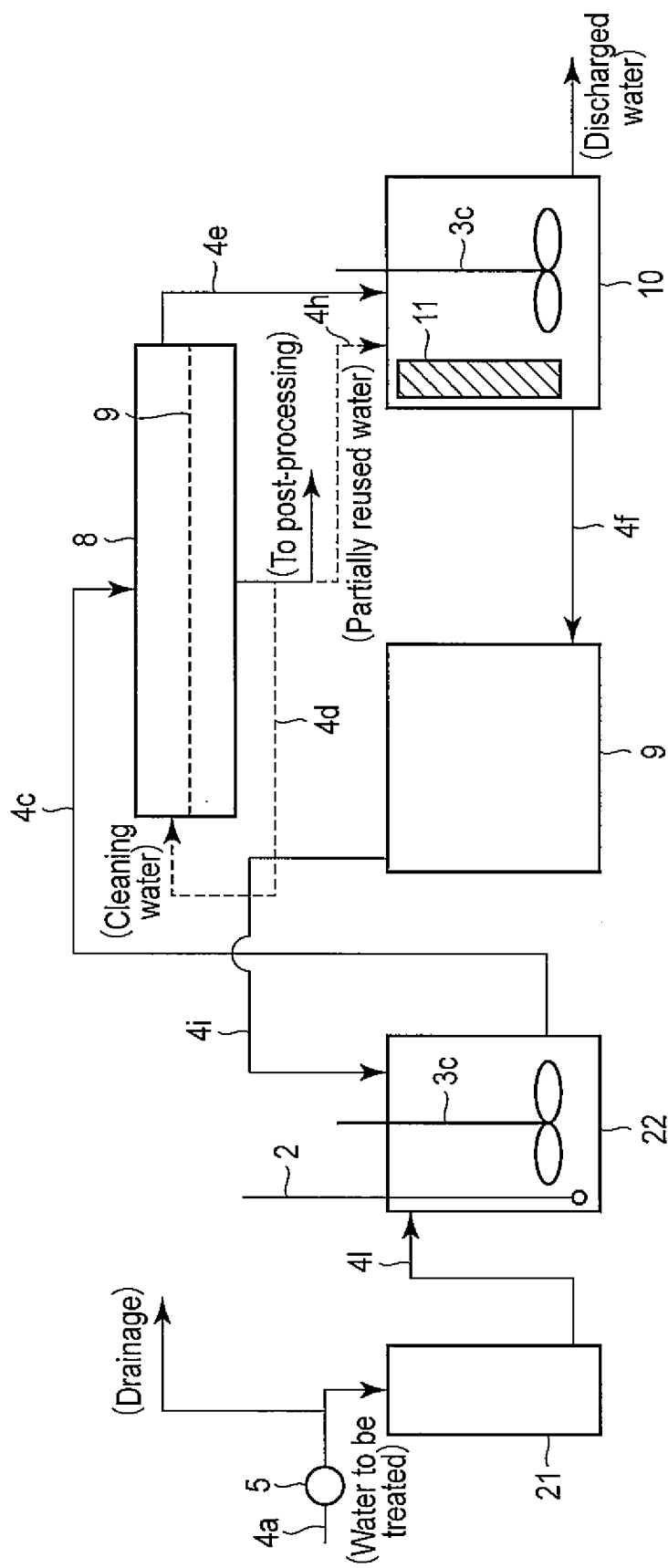
FIG. 6 is a schematic view of a fluorine recovering apparatus according to example 7.

FIG. 6 shows a schematic view of a fluorine recovering apparatus according to Example 7. The same members as those in FIGS. 1 to 3 are represented by the same reference numbers, and the descriptions thereof will be omitted. The recovering apparatus of FIG. 6 is different from the recovering apparatus of FIG. 4 in that the recovering apparatus of FIG. 6 is used as a pretreatment apparatus focusing on removal of calcium fluoride precipitated in a reaction of fluoride ions with calcium carbonate without using PAC, and roughly removing fluoride in water to be treated.

In Example 7, a hydrogen fluoride aqueous solution containing the fluoride ions of 200 mg/L was provided as the water to be treated.

First, the water to be treated was sent to an adsorption column 21 filled with calcium carbonate particles, and the calcium carbonate particles were reacted with fluorine. The liquid discharged from the adsorption column 21 was an opaque liquid. The liquid had a fluoride ion concentration of 50 mg/L and had dispersed calcium fluoride. On the other hand, a filter aid A was fed to a second mixing tank 22 from a filter aid tank 7 filled with the filter aid A to produce slurry. Then, the slurry was fed to a filtering device 8, and filtration was performed. It could be confirmed that 99% or higher of the fluoride (calcium fluoride) in the water contained in the second mixing tank 22 is recovered. Cleaning water was fed from the side of the filter 9 of the filtering device 8 after the filtration processing. The layer formed on the filter 9 was collapsed, and was fed to the separating tank 10. After the filter aid was separated from the fluoride by operating the stirrer 3c in the separating tank 10, the magnet 11 was operated to recover only the filter aid, and a fluorine-concentrated liquid was discharged.

The fluorine-concentrated liquid had a high concentration of calcium fluoride, and was easily reused. Then, the magnetic field of the magnet 11 was released, and cleaning water was fed to the separating tank 10 to produce filter aid slurry, which was returned to the filter aid tank 7. Then, the filter aid slurry was fed to the second mixing tank 22, and the same operations were performed. The filter aid slurry was reused without any problem. The treated water obtained from the filtering device 8 from which the fluorine had been roughly removed was transported to an after-treatment step.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for recovering fluorine, comprising:
   setting a first threshold value and a second threshold value lower than the first threshold value as two threshold values of a fluoride ion concentration in a fluoride ion-containing water to be treated;
   measuring the fluoride ion concentration in the water to be treated and determining whether the fluoride ion concentration is higher than the second threshold value;
   introducing the water to be treated to a precipitating device if the fluoride ion concentration is determined as equal to or higher than the second threshold value;
   measuring the fluoride ion concentration in the water to be treated introduced in the precipitating device;
   precipitating fluorine-containing precipitate in the precipitating device by reacting the water to be treated with a calcium source if the fluoride ion concentration is determined as equal to or higher than the first threshold value;
   precipitating fluorine-containing precipitate in the precipitating device by reacting the water to be treated with polyaluminum chloride if the fluoride ion concentration is determined as equal to or higher than the second threshold value and lower than the second threshold value;
   measuring the fluoride ion concentration in the water to be treated in the precipitating device and determining whether the fluoride ion concentration is lower than the second threshold value after the fluorine-containing precipitate is precipitated;
   mixing a filter aid comprising particles of a magnetic material and having a primary particle diameter of 0.5 to 5 μm with a dispersion medium to produce slurry;
   feeding the slurry to a solid-liquid separator provided with a filter to deposit a layer of the filter aid on the filter;
   introducing the water to be treated in the precipitating device to the solid-liquid separator thereby depositing the precipitate on the layer of the filter aid if the fluoride ion concentration in the water to be treated in the precipitating device is determined as lower than the second threshold value;
   removing the filter aid and the precipitate from the solid-liquid separator;
   separating the filter aid and the precipitate through magnetic separation; and
   reusing the separated filter aid.

2. The method for recovering fluorine according to claim 1, wherein calcium hydroxide is used as the calcium source.

3. The method for recovering fluorine according to claim 1, wherein the magnetic material is selected from the group consisting of iron, an alloy containing iron, magnetic iron ore, titanic iron ore, and magnetic pyrite.

4. The method for recovering fluorine according to claim 1, wherein the magnetic material is magnetite.

* * * * *